(12) United States Patent
Miocevich et al.

(10) Patent No.: US 10,794,699 B2
(45) Date of Patent: Oct. 6, 2020

(54) GYROSTABILISERS

(71) Applicant: VEEM Ltd, Canning Vale (AU)

(72) Inventors: Mark Miocevich, Applecross (AU); Michael Andrewartha, Ardross (AU)

(73) Assignee: VEEM Ltd, Canning Vale (AU)

( * ) Notice: Subject to any disclaimer, the term of this patent is extended or adjusted under 35 U.S.C. 154(b) by 331 days.

(21) Appl. No.: 15/681,037

(22) Filed: Aug. 18, 2017

(65) Prior Publication Data

US 2018/0051988 A1  Feb. 22, 2018

(30) Foreign Application Priority Data

Aug. 19, 2016  (AU) .................................. 2016903303

(51) Int. Cl.

| G01C 19/18 | (2006.01) |
|---|---|
| F16N 19/00 | (2006.01) |
| F16N 31/00 | (2006.01) |
| F16N 13/00 | (2006.01) |
| F16N 25/00 | (2006.01) |
| F16N 17/06 | (2006.01) |
| F16N 39/06 | (2006.01) |
| F16N 7/40 | (2006.01) |
| B63B 39/04 | (2006.01) |

(52) U.S. Cl.
CPC ............... *G01C 19/18* (2013.01); *F16N 7/40* (2013.01); *F16N 13/00* (2013.01); *F16N 17/06* (2013.01); *F16N 19/00* (2013.01); *F16N 25/00* (2013.01); *F16N 31/004* (2013.01); *F16N 39/06* (2013.01); *B63B 39/04* (2013.01); *F16N 31/00* (2013.01)

(58) Field of Classification Search
CPC ........ G01C 19/18; G01C 19/20; G01C 19/16; G01C 19/04; G01C 19/02; B63B 39/04; F16F 15/30; F16F 15/3156; F16F 15/315
See application file for complete search history.

(56) References Cited

U.S. PATENT DOCUMENTS

| 1,387,018 | A | 9/1921 | Sperry |
| 1,655,800 | A | 1/1928 | Schein |
| 2004/0244513 | A1 | 12/2004 | Adams et al. |
| 2007/0157749 | A1 | 7/2007 | Adams et al. |
| 2008/0303363 | A1 | 12/2008 | Alston |
| 2011/0232415 | A1* | 9/2011 | Early .................. F16F 15/3156 74/572.1 |
| 2015/0007686 | A1* | 1/2015 | Dharan .................. H02K 7/025 74/572.11 |
| 2018/0023661 | A1* | 1/2018 | Early .................... F16C 35/077 74/572.11 |

FOREIGN PATENT DOCUMENTS

| CN | 105292395 A | 2/2016 |
| JP | H10-244990 A | 9/1998 |

* cited by examiner

*Primary Examiner* — Richard W Ridley
*Assistant Examiner* — Brian J McGovern
(74) *Attorney, Agent, or Firm* — Levine Bagade Han LLP

(57) ABSTRACT

A gyrostabiliser having a vacuum chamber assembly is disclosed. The gyrostabilizer can have a flywheel enclosed within a vacuum chamber formed by a housing. The flywheel shaft can be fixed to or integral with the flywheel and located relative to the housing by upper and lower spin bearings which permit rotation of the flywheel about the spin axis.

39 Claims, 4 Drawing Sheets

GYROSTABILISERS

CROSS-REFERENCE TO RELATED APPLICATION

This application claims priority to Australian Provisional Patent Application No. 2016903303, filed Aug. 19, 2016, which is incorporated herein in its entirety.

TECHNICAL FIELD

The present invention relates to gyrostabilisers and specifically relates to the lubrication of the spin axis bearings.

BACKGROUND

Gyrostabilisers for stabilising bodies, such as for example marine vessels, are well known. Such gyrostabilisers include a flywheel which, in use, spins about a spin axis at a high rotational speed of typically three thousand to ten thousand revolutions per minute. The flywheel spin axis is held in a gimbal frame having a gimbal shaft or precession axis perpendicular to the spin axis, with the precession motions being braked and/or driven. Due to the high velocity of the outer rim of the flywheel, the gimbal frame is typically a chamber enclosing the flywheel to enable the flywheel to spin within a vacuum. This reduces drag which reduces heat generation and improves efficiency. The spin bearings used to locate the flywheel about the spin axis are subject to both high loads and high rotational speeds which also generate heat and noise.

The spin bearings and spin motor are usually located within the vacuum chamber to avoid issues associated with sealing the vacuum chamber where the spin shaft exits the vacuum chamber. Having the spin bearings within the vacuum chamber makes lubricating and cooling of the spin bearings difficult. It is even more difficult to cool the inner races of the spin bearings and the flywheel shaft because these are rotating and cannot easily be cooled by contact with a coolant jacket. The spin bearings are typically roller bearings lubricated by grease, although the use of plain bearings and of oil bath lubrication in nominally horizontal spin axis gyrostabilisers is known. However, recirculating oil systems are not used, partly because pumping oil into and out of a vacuum is difficult. Cooling fins and/or cooling jackets can be provided to assist cooling of the bearings and vacuum chamber, but even using a cooling jacket to cool the bearings does not provide effective cooling of the complete bearing.

The present invention was developed with a view to providing improved lubrication and/or cooling of the spin bearings of a gyrostabiliser.

The issues associated with sealing the vacuum chamber where the spin shaft exits the vacuum chamber are due to the high radial forces on the flywheel shaft. These high radial forces require a flywheel shaft of such a large diameter that the surface speed of a shaft seal is high, and also create a large radial movement or run-out at the shaft seal, the combination resulting in a seal with at least some leakage.

It has been found desirable that the present invention may further provide a lubrication arrangement that is tolerant of leakage of oil into the vacuum chamber.

SUMMARY

According to a first aspect of the invention there is provided a gyrostabiliser including a vacuum chamber assembly including: a flywheel enclosed within a vacuum chamber formed by a housing; a flywheel shaft fixed to or integral with the flywheel and located relative to the housing by upper and lower spin bearings which permit rotation of the flywheel about the spin axis, wherein, the vacuum chamber assembly further includes: an upper spin bearing chamber and an upper shaft seal around the flywheel shaft, the upper spin bearing chamber accommodating the upper spin bearing, and being separated from the vacuum chamber by the upper shaft seal; a lower spin bearing chamber and a lower shaft seal around the flywheel shaft, the lower spin bearing chamber accommodating the lower spin bearing, and being separated from the vacuum chamber by the lower shaft seal; and wherein the gyrostabiliser includes an oil circuit having at least one outlet into the upper spin bearing chamber, at least one drain out of the upper spin bearing chamber, at least one outlet into the lower spin bearing chamber and at least one drain out of the lower spin bearing chamber.

Preferably, the upper spin bearing chamber is formed at least in part by the housing. Preferably, the lower spin bearing chamber is formed at least in part by the housing. The upper spin bearing chamber and/or the lower spin bearing chamber may be provided in a respective bearing carrier.

The vacuum chamber may, in use, be at a pressure of less than minus 0.8 bar gauge (barg), preferably less than minus 0.9 bar gauge (barg), and more preferably less than minus 0.95 bar gauge (barg).

The upper and lower spin bearing chambers may, in use, be at a pressure of between minus 0.2 bar gauge (barg) and minus 0.8 bar gauge (barg), preferably between minus 0.3 bar gauge (barg) and minus 0.7 bar gauge (barg), and more preferably between minus 0.4 bar gauge (bag) and minus 0.6 bar gauge (barg).

Alternatively, the vacuum chamber may be at a pressure of less than 600 Torr (or 600 mmHg), although to reduce drag and heat generated by flywheel rotation the pressure in the vacuum chamber may preferably be less than 200 Torr and more preferably less than 50 Torr.

The pressure in the upper and lower spin bearing chambers may be between atmospheric pressure and vacuum chamber pressure, but preferably not less than 150 Torr to remain in an operating range of most pumps. So, for example, the pressure in the vacuum chamber and the spin bearing chambers can all be substantially equal at, for example, approximately 300 Torr, or preferably approximately 200 Torr.

Each of the at least one outlet may include or be at least one nozzle. The at least one outlet into the upper spin bearing chamber may include at least one oil jet or spray directed onto the upper spin bearing, such as by the at least one nozzle.

Additionally, or alternatively, the at least one outlet into the upper spin bearing chamber may include at least one oil jet or spray directed onto the upper shaft seal.

Additionally, or alternatively, the at least one outlet into the lower spin bearing chamber may include at least one oil jet or spray directed onto the lower spin bearing.

The lower spin bearing may include a first lower spin bearing and a second lower spin bearing, and the at least one outlet into the lower spin bearing chamber may include at least one oil jet or spray directed onto the first lower spin bearing and/or at least one oil jet or spray directed onto the second lower spin bearing.

Additionally, or alternatively, the at least one outlet into the lower spin bearing chamber may include one or more respective oil jet or spray directed onto the lower shaft seal.

The oil circuit may include at least one filter.

In one or more forms of the present invention the gyrostabiliser may further include an oil collection chamber, an oil reservoir, at least one return oil pump and a supply oil pump.

The oil reservoir may function as a contaminant settling tank, de-aeration tank, passive cooling tank and/or reservoir for maintenance, for example.

The oil collection chamber may be provided at least in part by the housing.

The at least one drain out of the upper spin bearing chamber and the at least one drain out of the lower spin bearing chamber may preferably be connected to the oil collection chamber.

A radial throwing disc may be located in the oil collection chamber, preferably fixed to or driven by the flywheel shaft, although it can be driven by any known means.

The radial throwing disc is provided to throw or urge oil toward radial ports on the oil collection chamber, the radial ports being connected to the at least one return oil pump.

The oil circuit may include: the oil reservoir; the supply pump connected between the oil reservoir and the at least one outlet into each bearing chamber; a drain conduit connecting the at least one drain out of the upper spin bearing chamber to the oil collection chamber and a drain path from the at least one drain out of the lower spin bearing chamber to the oil collection chamber; the at least one return oil pump being provided to pump oil from the oil collection chamber to the oil reservoir.

The at least one return oil pump may be located in the oil collection chamber, for example the at least one return oil pump may be driven by the flywheel shaft. Such a flywheel shaft driven pump may be of the gear, screw, diaphragm or piston type for example.

Alternatively, the at least one return oil pump may be connected between the oil collection chamber and the oil reservoir and could be electrically driven. When the pump is not located in the oil collection chamber, the use of the optional radial throwing disc can be beneficial to help prime the inlet of the pump with oil.

The gyrostabiliser may further include an oil cooler. For example, the oil cooler may include a radiator located in the oil circuit, or include a passive tank the walls of which radiate heat energy from the oil.

The passive tank may, for example, be the oil reservoir and, as mentioned above, may allow particulates and air bubbles to settle out, or may preferably include a heat exchanger having an oil portion forming part of the oil circuit e.g. oil is pumped through the heat exchanger, for example, between the reservoir and the outlets, and a coolant portion through which water or coolant flows or is pumped.

The gyrostabiliser may further include a vacuum chamber oil scavenge cavity located in the housing towards the bottom of the vacuum chamber.

The vacuum chamber oil scavenge cavity may be connected to the oil collection chamber by a pumping arrangement to enable oil to be pumped out of the vacuum chamber and ultimately returned to the oil reservoir.

The pumping arrangement may include: an intermediate tank; a lower valve for selectively communicating the intermediate tank to the oil collection chamber; an upper valve for selectively communicating the vacuum chamber oil scavenge cavity to the intermediate tank; and a pressure switching valve for selectively communicating the intermediate tank with the vacuum chamber or atmosphere.

The gyrostabiliser may further include a coolant circuit including: a coolant pump; a coolant reservoir: at least one oil heat exchanger; and a water heat exchanger, preferably a sea water heat exchanger. The water may be salt water or fresh water.

The coolant circuit may further include a cooling jacket for the upper spin bearing and/or a cooling jacket for the lower spin bearing. Similarly, the coolant circuit may further include a cooling plate or jacket for a spin motor and optionally a spin motor drive.

The coolant circuit may further include one or more cooling plates or jackets for at least one precession control motor(s) and precession motor drive(s). Additionally, or alternatively, the coolant circuit may further include a cooling jacket for the spin braking resistor.

The coolant circuit may further include a bypass conduit or passage in parallel with a coolant flow path through the water heat exchanger and a bypass valve for controlling the balance of coolant flow through the bypass conduit or passage and through the coolant flow path through the water heat exchanger.

Preferably, the balance of coolant flow through the water heat exchanger versus through the bypass conduit or passage is controlled as a function of the temperature of the coolant at or near a coolant inlet to the water heat exchanger.

The at least one oil heat exchanger may include a lubrication oil heat exchanger having an oil inlet and an oil outlet forming part of the oil circuit, in addition to and separate from a coolant flow path through the lubrication oil heat exchanger including a coolant inlet and a coolant outlet. In this instance, the oil is the oil lubricating the spin bearings.

The lubricating oil heat exchanger may be the aforementioned oil cooler.

Additionally, or alternatively, the at least one oil heat exchanger may include a hydraulic oil heat exchanger having a hydraulic oil inlet and a hydraulic oil outlet forming part of a hydraulic circuit including a hydraulic manifold, in addition to and separate from a coolant flow path through the hydraulic oil heat exchanger including a coolant inlet and a coolant outlet. In this instance the oil is hydraulic oil from for example a precession control arrangement.

The gyrostabiliser may further include an air circuit including: a vacuum pump in fluid communication with the vacuum chamber; and an air dryer.

The air circuit may further include a vent relief valve connected by a reservoir pressure conduit to a port at or toward a top of the oil reservoir.

The air circuit may further include a pressure regulating valve connected between the reservoir pressure conduit and a port on the housing. For example, the port on the housing may be into the upper spin bearing chamber and/or and lower spin bearing chamber.

The pressure regulating valve may only permit flow from the reservoir pressure conduit into the port on the housing when a pressure drop across the pressure regulating valve is greater than a pre-set magnitude, such as, for example, approximately 0.7 bar.

The air circuit may further include an oil trap in the reservoir pressure conduit between the vent relief valve and the oil reservoir, the pressure regulating valve being connected to the reservoir pressure conduit by a port toward a base of the oil trap. Then the pressure regulating valve can facilitate return of oil from the oil trap back into the oil circuit by permitting flow from the oil trap to a port on the housing, the port on the housing being for example into the upper spin bearing chamber and/or and lower spin bearing chamber.

The air circuit may further include a bleed back check valve between the reservoir pressure conduit and the air dryer.

The air circuit may in addition to the aforementioned pressure switching valve and intermediate tank further include: a conduit connecting the pressure switching valve to the air dryer; a conduit connecting the pressure switching valve to the intermediate tank; and a conduit connecting the pressure switching valve to the vacuum chamber.

Another aspect of the present invention provides a lubrication arrangement for a vacuum chamber assembly for a gyrostabiliser, the vacuum chamber assembly including: a flywheel enclosed within a vacuum chamber formed by a housing; a flywheel shaft fixed to or integral with the flywheel and located relative to the housing by upper and lower spin bearings which permit rotation of the flywheel about the spin axis; an upper spin bearing chamber and an upper shaft seal around the flywheel shaft, the upper spin bearing chamber accommodating the upper spin bearing, and being separated from the vacuum chamber by the upper shaft seal; a lower spin bearing chamber and a lower shaft seal around the flywheel shaft, the lower spin bearing chamber accommodating the lower spin bearing, and being separated from the vacuum chamber by the lower shaft seal; the lubrication arrangement including at least one oil jet or spray into the upper spin bearing chamber and at least one oil jet or spray into the lower spin bearing chamber.

As mentioned above, preferably, the upper spin bearing chamber is formed at least in part by the housing.

Preferably, the lower spin bearing chamber is formed at least in part by the housing.

The upper spin bearing chamber and/or the lower spin bearing chamber may be provided in a respective bearing carrier.

Another aspect of the present invention provides a system for lubricating a spin bearing of a gyrostabiliser, the system including a lubrication circuit, a coolant circuit and an air circuit.

The lubrication circuit may include at least one jet or spray for releasing lubricating oil into a bearing chamber housing of the spin bearing.

The coolant circuit may include at least one lubricating oil heat exchanger for drawing heat out of the lubricating oil of the lubricating circuit.

Alternatively, or additionally, the coolant circuit may include a pump and a water heat exchanger for drawing heat out of coolant in the coolant circuit.

The air may circuit include a vacuum pump and valves wherein the valves control a pressure in the bearing chamber to be between a pressure in a vacuum chamber of the gyrostabiliser and an atmospheric pressure.

The system may further include an intermediate tank having an upper oil port and an upper air port for example located at or towards a top of the intermediate tank, a lower oil port located at or toward a base of the intermediate tank and a level sensor; the lubrication circuit may include a first lockout valve between the upper oil port of the intermediate tank and a port towards a bottom of a vacuum chamber of the gyrostabiliser and a second lockout valve between the lower oil port of the intermediate tank and an oil collection chamber of the gyrostabiliser; the air circuit may include a pressure switching valve to selectively communicate a conduit connected to the upper air port of the intermediate tank to either the vacuum chamber of the gyrostabiliser or to atmosphere, preferably via an air dryer.

It will be convenient to further describe the invention by reference to the accompanying drawings which illustrate preferred embodiments of the present invention.

Other embodiments of the present invention are possible and consequently particularity of the accompanying drawings is not to be understood as superseding the generality of the preceding description of the invention.

DETAILED DESCRIPTION

Figure 1:
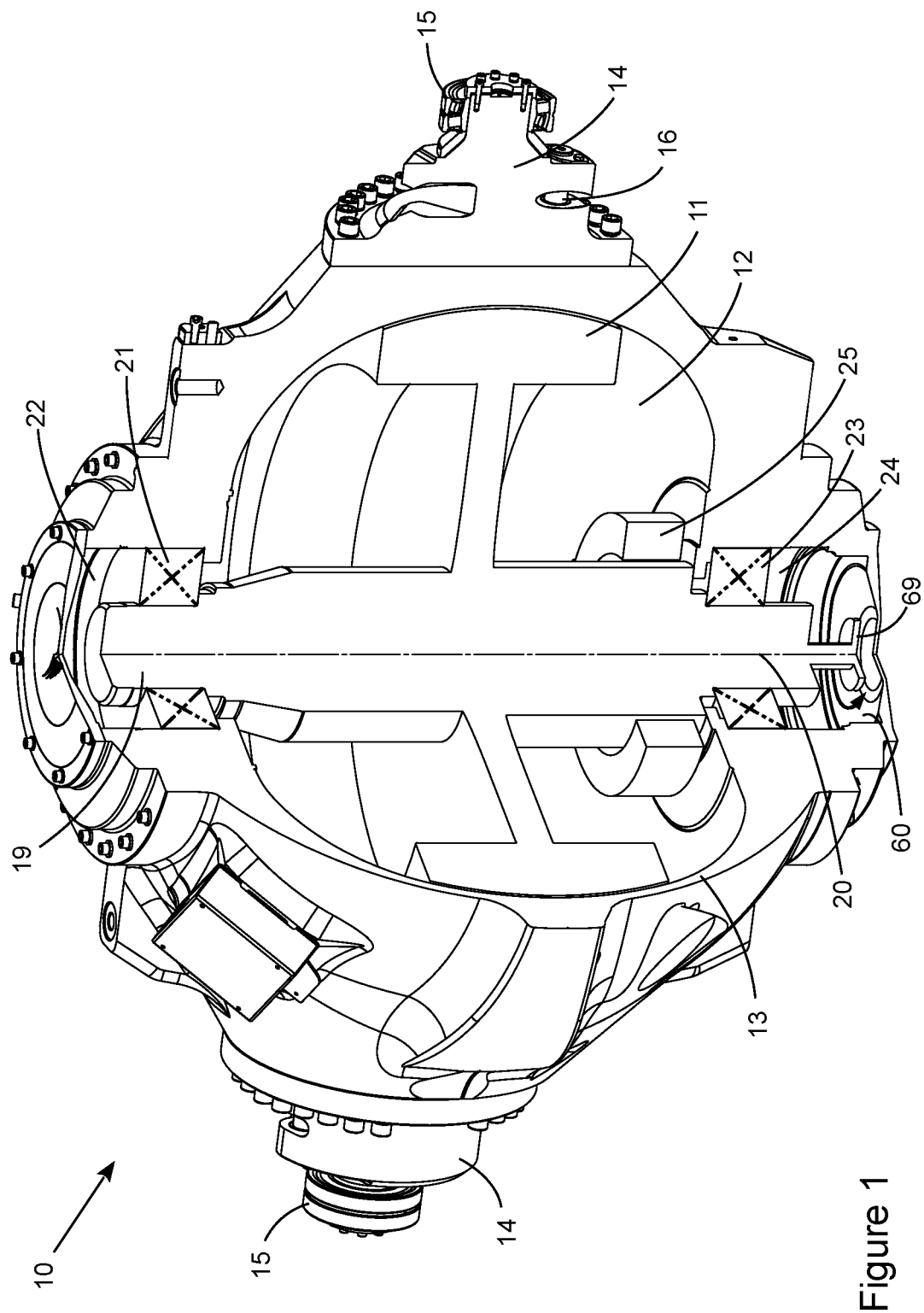
FIG. 1 is a cut away perspective view of a gyrostabiliser vacuum chamber.

Referring initially to FIG. 1, there is shown the vacuum chamber assembly 10 of a gyrostabiliser. The flywheel 11 is housed in the vacuum chamber 12 or flywheel chamber, formed within the housing 13. The housing is pivotally mounted on precession bearing stubs 14 fixed to the housing 13, with the precession bearings 15 being shown fitted to the stub axles 14. The rotation of the vacuum chamber assembly 10 around the precession axis is controlled by precession control devices such as dampers or actuators as is well known and the precession bearing stubs 14 also include precession damper or actuator mounts 16. The flywheel 11 is mounted on, fixed to, or, as shown, integrally formed with the flywheel shaft 19, which is, in turn, located relative to the housing 13 by upper spin bearing 21 and lower spin bearing 23 such that the flywheel 11 can rotate relative to the housing about the spin axis 20, driven by the spin motor 25. The upper spin bearing 21 is positioned within the upper spin bearing chamber 22 and similarly the lower spin bearing 23 is positioned within the lower spin bearing chamber 24. However, recirculating oil lubrication systems are not typically possible in gyrostabilisers in which the flywheel shaft 19 is nominally vertical (i.e. in use oscillating up to +/−70 degrees for example either side of vertical) since the shaft seals between the vacuum chamber 12 and the spin bearing chambers 22, 23 have unavoidable leakage due to high surface speed and large runout, as discussed above; hence, the typical use of grease in such applications since it holds in place. The present arrangement of an oil circuit and an air circuit is leakage tolerant, enabling oil leakage from the bearing chambers into the vacuum chamber to be purged back into the oil circuit. A radial throwing disc 69 is located in an oil collection chamber 60 and fixed to the flywheel shaft 19.

Figure 2:
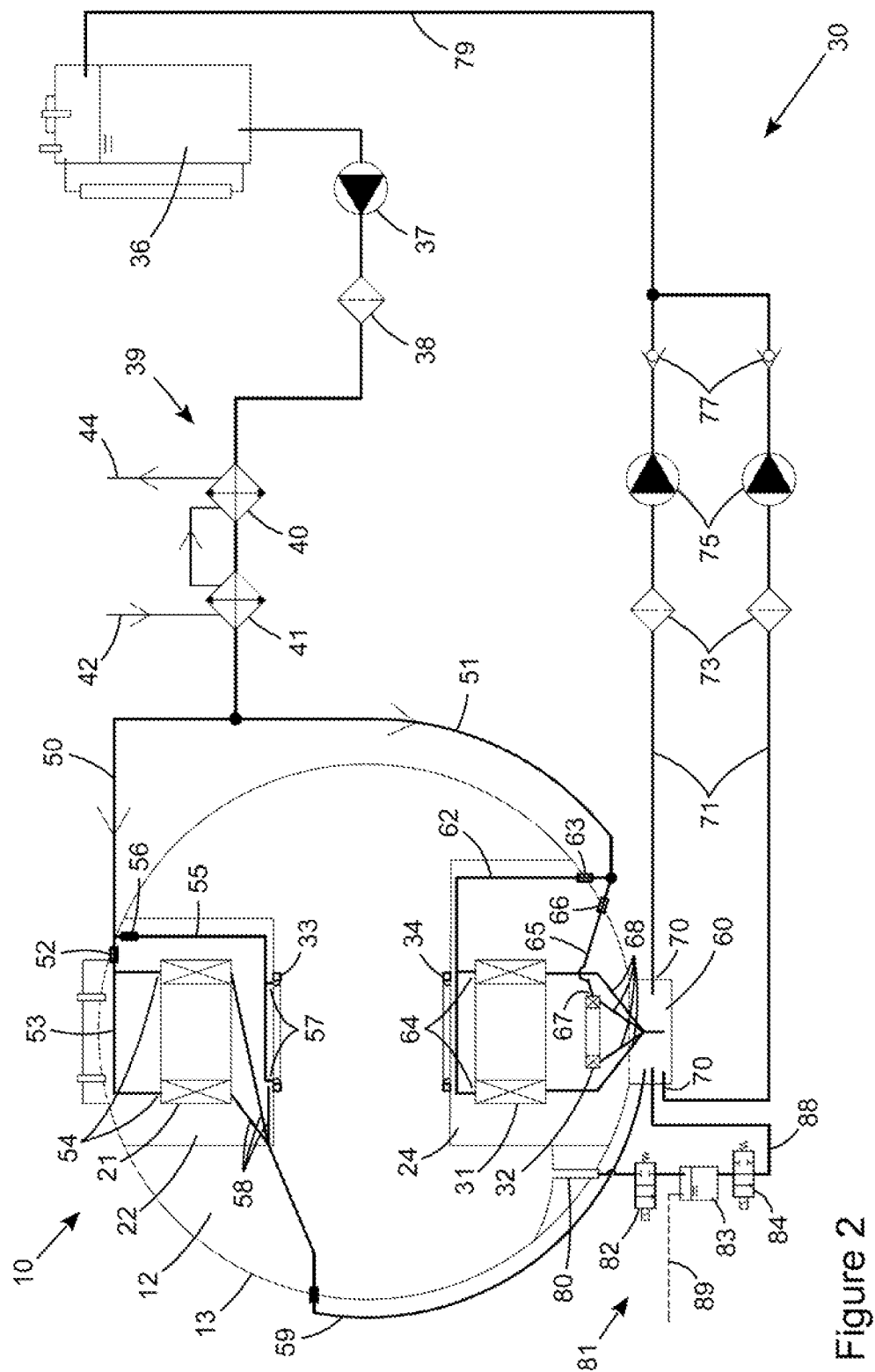
FIG. 2 is a schematic view of an oil circuit according to an embodiment of the present invention.

FIG. 2 shows the lubrication arrangement or oil circuit 30 providing lubrication and cooling of the spin bearings which in this example are the upper spin bearing 21, first lower spin bearing 31 and second lower spin bearing 32. The second lower spin bearing can be a bearing type suited to large thrust loads to support the flywheel (omitted for clarity). In the Figures, common reference numerals are used for similar or equivalent features.

FIG. 2 also shows seals 33, 34 between the bearing chambers 22, 24 and the vacuum chamber 12 to allow the bearing chambers to be at a different pressure to the vacuum chamber and to prevent free flow of the lubrication oil into the vacuum chamber. There are two primary benefits of the bearing chambers being at a different pressure to the vacuum chamber: firstly, pumping oil out of a vacuum chamber is not straightforward due, for example, to cavitation; and secondly, the pressure differential between the vacuum chamber 12 and a spin bearing chamber 22 or 24 can assist with energising of the seal 33 or 34. The seals 33, 34 are located around the flywheel shaft (the flywheel shaft omitted for clarity in FIG. 2) and can be any rotary shaft seal.

Oil is pumped from the oil reservoir 36 by a supply oil pump 37 through a filter 38 and then an oil cooler or heat exchanger 39. The oil cooler 39 is shown as two heat exchanger units 40, 41 in series with coolant flow in though conduit 42 and out through conduit 44. Oil exits the heat exchanger and the flow is then split between a conduit 50 towards the upper spin bearing chamber 22 and a conduit 51 towards the lower spin bearing chamber 24. Cooling the oil before it passes through and around the spin bearings helps to cool the spin bearings at the point of heat generation and provides cooling not possible with grease lubrication. The oil reservoir can also act as a passive cooling tank.

The conduit 50 towards the upper spin bearing chamber 22 then branches again into conduit 52 through restriction 53 to outlets or nozzles 54 spraying jets of oil onto the upper spin bearing 21, and to conduit 55 through restriction 56 to nozzles 57 spraying jets of oil onto the upper shaft seal 33. Drain lines 58, can be one or more lines connected to opposite ports perpendicular to the orientation of the precession axis such that oil drains out of the two ports alternately as the vacuum chamber assembly precesses. In the schematic of FIG. 2, three drain lines 58 are shown, two from the regions under opposite sides of the upper spin bearing 21 and one from the seal region, all joining into drain conduit 59 passing through the housing 13 out of the vacuum chamber 12 and down to the oil collection chamber 60.

The conduit 51 towards the lower spin bearing chamber 24 similarly branches out again into conduit 62 through restriction 63 to outlets or nozzles 64 spraying jets of oil onto the first lower spin bearing 31, and to conduit 65 through restriction 66 to nozzles 67 spraying jets of oil onto the second lower spin bearing 32. Although not shown in FIG. 2, jets of oil can be sprayed up onto the lower shaft seal 34. The restrictions 53, 56, 63, 66 and/or the number of nozzles 54, 57, 64, 67 can be used to balance the flow of oil pumped to the different bearings and seals. Drain lines 68 show the drain path of oil draining out of the lower spin bearings 31, 32 into the oil collection chamber 60. A radial throwing disc (not shown in FIG. 2. Radial throwing disc 69 is shown in FIG. 1) can optionally be used in the oil collection chamber 60 to throw any oil in the chamber radially towards the radial ports 70 to which return oil conduits 71 are connected. Such a radial throwing disc is preferably driven by, and ideally fixed to, the flywheel shaft. In each return oil conduit is a filter 73, a return oil pump 75 and a non-return valve 77. As the oil collection chamber 60 is at a similar pressure to the spin bearing chambers 22, 24, i.e. between atmospheric pressure and the vacuum chamber pressure, then pumping oil out of the oil collection chamber, then pumping oil out of the oil collection chamber can be difficult, but the use of a radial throwing disc can help oil enter the return oil conduits and thus assist the operation of the return oil pumps 75. The output of the return oil conduits is connected to the oil reservoir 36 by conduit 79. The return oil pumps 75 can be electrically driven, or if located in the oil collection chamber 60 to avoid any need for a radial throwing disc, can alternatively be mechanically driven by the flywheel shaft. Various types of pump can be suitable, including gear, screw, diaphragm or piston pumps or other types of pump that can pump a mixed flow, i.e. typically an oil and air foam. The oil reservoir functions most importantly as an oil de-aerator, but can provide other functions such as allowing contaminants to settle out and/or to provide passive cooling of the oil.

Any oil drawn past the upper or lower shaft seals 33, 34 into the vacuum chamber 12 accumulates in the bottom of the vacuum chamber and collects in the oil scavenge cavity 80. However, pumping the oil out of the vacuum chamber oil scavenge cavity 80 can again be difficult due to cavitation. The pumping arrangement 81 uses the pressure differences between the vacuum chamber 12, the oil collection chamber 60 (and spin bearing chambers) and atmosphere to pump oil from the vacuum chamber oil scavenge cavity 80 to the oil collection chamber 60. Upper valve 82 which can be a switchable one-direction valve or lockout valve, selectively allows the vacuum chamber oil scavenge cavity 80 to be connected to an intermediate tank 83. Similarly, lower valve 84 selectively allows the intermediate tank to be connected to the oil collection chamber 60 via oil return conduit 88. Conduit 89 is an air pressure conduit that is shown in the air circuit 90 in FIG. 3 and is used to change the pressure in the intermediate tank 83.

Figure 3:
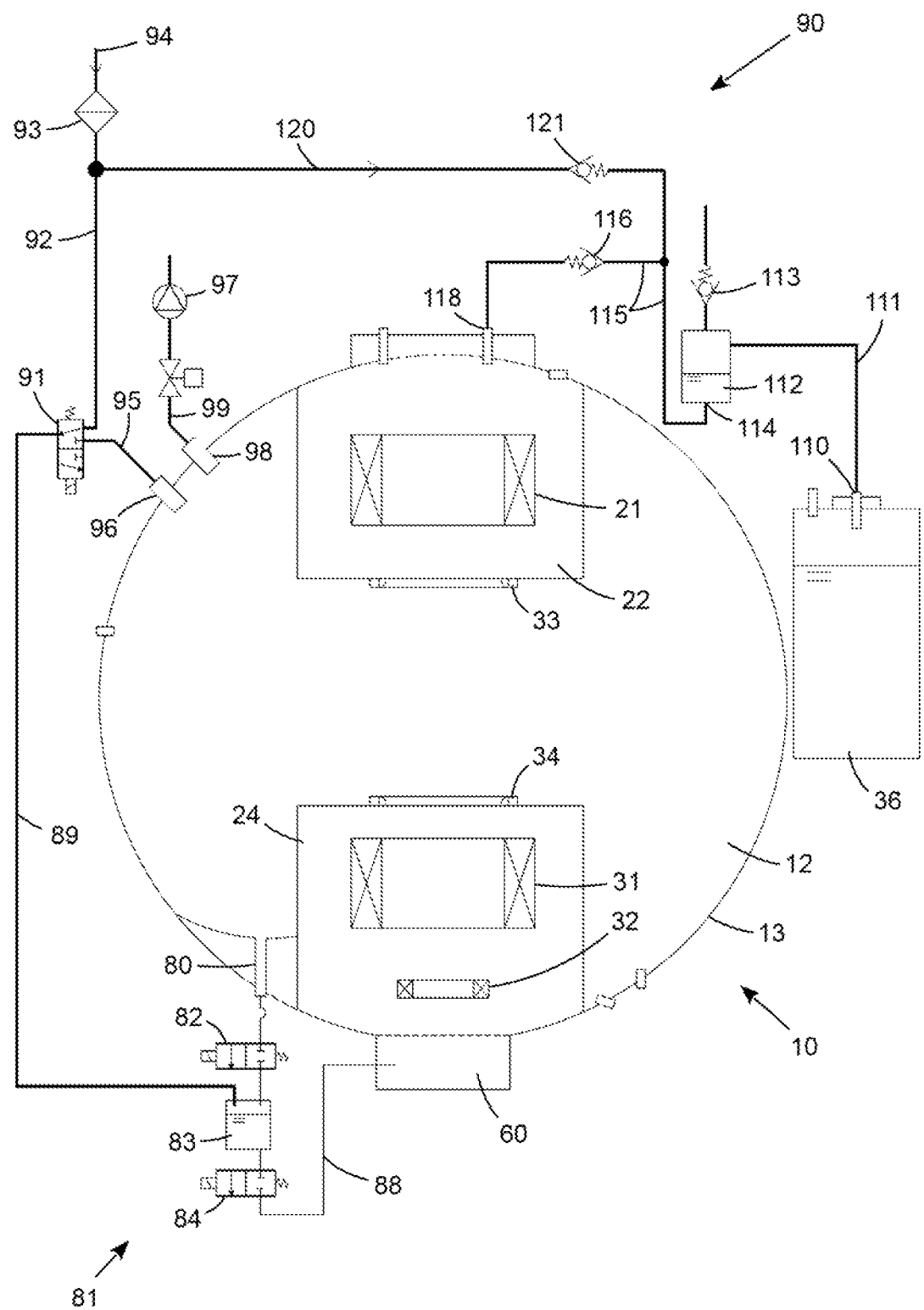
FIG. 3 is a schematic view of an air circuit according to an embodiment of the present invention.

The pumping arrangement 81 of the upper valve 82, intermediate tank 83, lower valve 84 and oil return conduit 88 can be seen again in FIG. 3 along with the remainder of the components which are part of the air circuit 90. In FIG. 3, the oil conduits are shown in as thinner lines compared to the air conduits. The pressure switching valve 91 switches the communication of the air pressure conduit 89 between the low pressure in the vacuum chamber 12 (via conduit 95 and port 96 in the housing 13) and the atmospheric pressure in air conduit 92 connected to air dryer 93 (and ultimately to atmosphere at 94). Upper valve 82 can be either normally open or preferably, as shown, normally closed and then selectively opened to allow oil to drain from the vacuum chamber oil scavenge cavity 80 into the intermediate tank 83. Ideally a level sensor is provided in the intermediate tank to determine when the quantity of oil in the tank needs to be reduced, at which time, with the upper valve 82 closed, the pressure switching valve 91 can connect the intermediate tank to atmospheric pressure. Then either the pressure switching valve 91 remains connecting the intermediate tank to atmospheric pressure and the lower valve 84 is momentarily opened, or the pressure switching valve 91 is closed and the lower valve 84 momentarily opened to connect the intermediate tank 83 with the oil collection chamber 60. In either case the pressure differential of the air at atmospheric pressure in the intermediate tank 83 compared to the partial vacuum in the oil collection chamber 60 drives oil along the oil conduit 88 out of the intermediate tank and into the oil collection chamber. Once the lower valve 84 is closed, the pressure switching valve 91 can communicate the intermediate tank with vacuum chamber again to equalise the pressures and permit oil to once again drain from the vacuum chamber into the intermediate tank 83 when upper valve 82 is opened. As the volume of the intermediate tank is typically 4 orders of magnitude smaller than the vacuum chamber, the pumping cycle of valve operations described can be completed several times before the vacuum pump needs to extract the air introduced at the end of each cycle when the intermediate tank is communicated with the vacuum chamber via the pressure switching valve 91.

Vacuum pump 97 draws air out of the vacuum chamber 12 through port 98 in the housing and conduit 99. The vacuum chamber is kept close to −1 bar gauge (minus 1 bar gauge or 1 bar below atmospheric pressure). For example, the vacuum chamber may, in use, be at a pressure of less than minus 0.2 bar gauge or 600 Torr (mmHg), but at that pressure air friction at the periphery of the flywheel generates heat and requires more power to rotate the flywheel, although the heat can be transferred by convection to the housing which in turn can be cooled. However, to avoid those issues, in use, the vacuum chamber is preferably at a pressure of less than −0.73 bar gauge (200 Torr), or less than −0.8 bar gauge (150 Torr), or preferably less than −0.9 bar gauge (75 Torr), and more preferably less than −0.93 barg (50 Torr).

The other portion of the air circuit controls the pressure in the oil reservoir 36 and the pressure in the upper and lower spin bearing chambers 22, 24. The oil reservoir 36 is vented from a port 110 at or near the top of the reservoir, through reservoir pressure conduit 111 via an oil trap 112 to vent relief valve 113 which is typically set at approximately 0.2 bar. The vent relief valve vents to atmosphere either directly or back through the dryer and ensures that the pressure in the oil reservoir is a maximum of 0.2 bar gauge. The oil trap 112 is optional but when provided can help to ensure that oil does not pass through the vent relief valve 113. Port 114 at the bottom of the oil trap 112 is connected to conduit 115 in which there is a pressure regulating valve 116 to regulate the pressure of the air inlet into the spin bearing chambers. When the oil trap 112 is provided, this also permits oil from the oil trap to be returned to one of the volumes from which oil is drained and/or pumped back to tank. In this example, the pressure regulating valve 116 is connected to port 118 on the housing into the upper spin bearing chamber 22, so if the pressure regulating valve is a check valve set to open at a differential pressure of 0.7 bar and the pressure in the reservoir 36 (and the reservoir pressure conduit 111 and oil trap 112) is 0.2 bar gauge, then the pressure in the upper spin bearing chamber 22 will be approximately −0.5 bar gauge. The upper and lower bearing chambers 22, 24 are connected via the oil collection chamber 60 and the drain conduit. The pressure in the bearing chambers can be between the vacuum chamber pressure and atmospheric pressure, but preferably higher than −0.8 bar gauge to prevent unnecessary difficulties in pumping oil back to the reservoir. Preferably, in use, the pressure in the bearing chambers 22, 24 is between −0.2 bar gauge and −0.8 bar gauge, more preferably between −0.3 bar gauge and −0.7 bar gauge and yet more preferably between −0.4 bar gauge and −0.6 bar gauge.

When the gyrostabiliser is not in use, i.e. when the flywheel is not spinning, then it is advantageous that the pressure in the spin bearing chambers 22, 24 rises closer to atmospheric pressure, generating an increase in the pressure differential across the shaft seals 33, 34 and thus energising them more positively onto the flywheel shaft to a level that together with the lack of rotation, provides improved sealing to maintain the vacuum in the vacuum chamber for extended periods of non-use. Bleed back conduit 120 is connected to the oil trap return conduit 115 by bleed back check valve 121 to enable a slow bleed of air into the bearing chambers and without the return oil pumps (75 in FIG. 2) operating to keep drawing the pressure in the bearing chambers down, the pressure gradually rises. When the return oil pumps of the oil circuit shown in FIG. 2 are operating, they are pumping a mixed flow, i.e. oil and air typically mixed together as a foam, which results in the return oil pumps effectively pumping air out of the bearing chambers 22, 24 as well as oil, but only oil is pumped back into the bearing chambers, hence the ability to regulate the pressure in the bearing chambers by a system of passive valves such as the check valves and pressure relief valves shown in the air circuit in FIG. 3.

Figure 4:
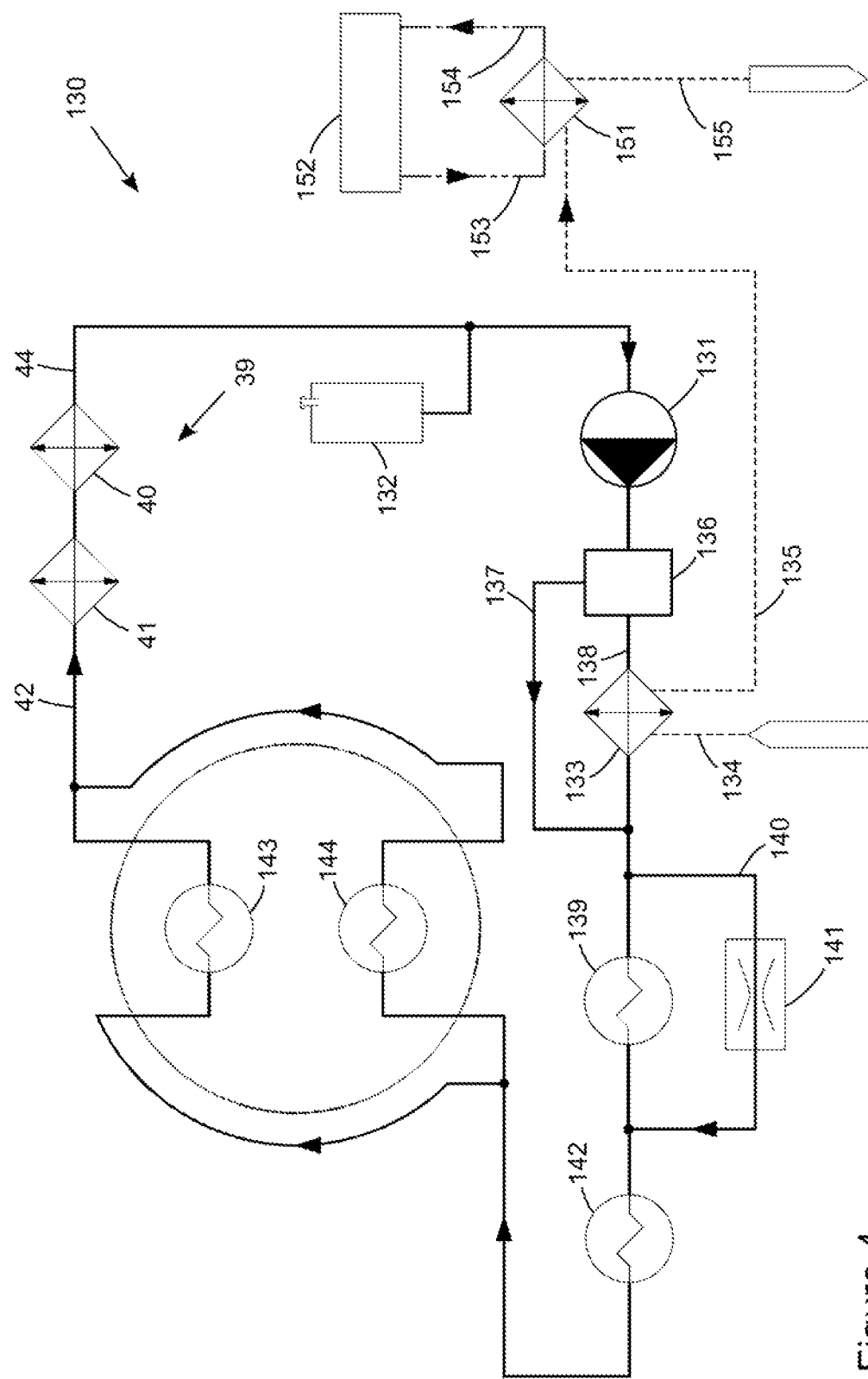
FIG. 4 is a schematic view of a coolant circuit according to an embodiment of the present invention.

FIG. 4 shows the coolant circuit 130 in which coolant pump 131 pumps coolant around the circuit. A header tank or coolant reservoir 132 is provided for expansion and maintenance. The coolant passes through sea water heat exchanger 133 which is cooled by the flow of sea water (or fresh water if operating in fresh water) in through conduit 134 and out through conduit 135, unless bypass valve 136 directs the coolant flow wholly or in part through the bypass conduit or passage 137. Ideally the coolant system is regulated to a predetermined temperature, such as 40 degrees, to help manage tolerances by minimising changes in bearing clearances and by maintaining a known oil viscosity for example through minimising operating temperature changes. The bypass valve 136 can be electronically controlled in dependence on a sensed temperature of one or more components of the gyrostabiliser and the sea water for example, or can be a mechanical type thermal bypass valve. In either case the balance of coolant flow through conduit or passage 138 and the sea water heat exchanger or through the bypass conduit or passage 137 is varied as a function of temperature.

In the example in FIG. 4, the coolant flows through a jacket 139 for the spin braking resistor (not shown) and a bypass 140 around the spin braking resistor cooling jacket 139, controlled by an orifice 141, then through a cooling plate or jacket 142 for the spin motor.

The coolant can flow in series, or as shown in FIG. 4 in parallel, through a cooling jacket 143 for the upper spin bearing and a cooling jacket 144 for the lower spin bearing.

In FIG. 4 two oil coolers or heat exchangers are shown, the lubrication oil heat exchanger 39 shown also in FIG. 2, and the hydraulic oil heat exchanger 151. The lubrication oil heat exchanger 39 comprises the two heat exchanger units 41 and 40 as shown also in FIG. 2. Coolant enters the first heat exchanger unit 41 from conduit 42, passes along the coolant flow path through the heat exchangers including conduit 43, and exits the other heat exchanger unit 40 into conduit 44, from where the coolant returns to the start of the circuit. The hydraulic oil heat exchanger 151 could be part of the coolant circuit, but is preferably cooled directly by sea water as shown in FIG. 4. The hydraulic manifold 152, which can be part of a precession control arrangement providing damping or active control, passes hydraulic oil through the heat exchanger 151 through hydraulic oil inlet conduit 153 and hydraulic oil outlet conduit 154. Sea water, in this example, also passes through the heat exchanger 151 from the conduit 135, the sea water leaving through conduit 156.

The coolant circuit can therefore cool the outside of the spin bearings by jackets around the bearings and cool the inside of the bearings by cooling the oil that passes through the bearings. So in addition to reducing noise through oil lubrication, heat in the bearings is controlled, reducing tolerance issues through limiting thermal expansion and improving life. Further improvements to noise and especially life are provided by through the action of the oil washing particulates and contaminants out of the bearings, such debris then being filtered through filtration of the oil in the oil circuit.

The bearings can be roller bearings or hydrodynamic bearings such as white metal plain bearings. Plain bearings are not typically able to operate at the high loads and rotational velocities of gyrostabiliser flywheel shafts with grease lubrication and oil lubrication has not been possible until the improvements detailed herein, such as using bearing chambers at a pressure between the vacuum chamber and atmosphere and using a pumping arrangement to pump oil accumulating in the bottom of the vacuum chamber out of the vacuum.

Methods other than that disclosed can be used to pump oil out of the vacuum chamber, but most are much less reliable than the solenoid valve and intermediate tank arrangement proposed, since pumping oil out from less than −0.7 barg is problematic using existing pumps.

If the return oil pump (or pumps) for the oil in the oil collection chamber under the lower bearing chamber is located in a conduit as shown in FIG. 2, the provision of the radial throwing disc shown in FIG. 1 can be beneficial to try to prime the pump and improve service life since the pump is operating with up to a −0.7 bar pressure at inlet compared to outlet.

Other modifications and variations as would be apparent to a skilled addressee are deemed to be within the scope of the present invention.

We claim:

1. A gyrostabiliser including a vacuum chamber assembly comprising:
   a flywheel enclosed within a vacuum chamber formed by a housing; a flywheel shaft fixed to or integral with the flywheel and located relative to the housing by upper and lower spin bearings which permit rotation of the flywheel about the spin axis, wherein the vacuum chamber assembly further comprises:
   an upper spin bearing chamber and an upper shaft seal around the flywheel shaft, the upper spin bearing chamber accommodating the upper spin bearing, and being separated from the vacuum chamber by the upper shaft seal, allowing the upper spin bearing chamber to be maintained at a different pressure to the vacuum chamber,
   a lower spin bearing chamber and a lower shaft seal around the flywheel shaft, the lower spin bearing chamber accommodating the lower spin bearing, and being separated from the vacuum chamber by the lower shaft seal, and
   wherein the gyrostabiliser comprises an oil circuit having at least one outlet into the upper spin bearing chamber, at least one drain out of the upper spin bearing chamber, at least one outlet into the lower spin bearing chamber and at least one drain out of the lower spin bearing chamber.

2. The gyrostabiliser of claim 1, wherein the vacuum chamber is, in use, at a pressure of less than minus 0.8 bar gauge.

3. The gyrostabiliser of claim 1, wherein the upper and lower spin bearing chambers are, in use, at a pressure of less than minus 0.2 bar gauge and more than minus 0.8 bar gauge.

4. The gyrostabiliser of claim 1, wherein each of the at least one outlet comprises at least one nozzle.

5. The gyrostabiliser of claim 1, wherein the at least one outlet into the upper spin bearing chamber provides at least one oil jet or spray directed onto the upper spin bearing.

6. The gyrostabiliser of claim 1, wherein the at least one outlet into the upper spin bearing chamber provides an oil jet or spray directed onto the upper shaft seal.

7. The gyrostabiliser of claim 1, wherein the at least one outlet into the lower spin bearing chamber provides an oil jet or spray directed onto the lower spin bearing.

8. The gyrostabiliser of claim 1, wherein the lower spin bearing comprises a first lower spin bearing and a second lower spin bearing and wherein the at least one outlet into the lower spin bearing chamber provides an oil jet or spray directed onto the first lower spin bearing and an oil jet or spray directed onto the second lower spin bearing.

9. The gyrostabiliser of claim 1, wherein the at least one outlet into the lower spin bearing chamber provides an oil jet or spray directed onto the lower shaft seal.

10. The gyrostabiliser of claim 1, wherein the oil circuit comprises at least one filter.

11. The gyrostabiliser of claim 1, further comprising an oil collection chamber, an oil reservoir, at least one return oil pump and a supply oil pump.

12. The gyrostabiliser of claim 11, wherein the oil collection chamber is formed at least in part by the housing.

13. The gyrostabiliser of claim 11, wherein the at least one drain out of the upper spin bearing chamber and the at least one drain out of the lower spin bearing chamber are connected to the oil collection chamber.

14. The gyrostabiliser of claim 11, further comprising a radial throwing disc located in the oil collection chamber and fixed to or driven by the flywheel shaft.

15. The gyrostabiliser of claim 11, wherein the oil circuit comprises:
   the oil reservoir;
   the supply pump connected between the oil reservoir and the at least one outlet into each bearing chamber;
   a drain conduit connecting the at least one drain out of the upper spin bearing chamber to the oil collection chamber and a drain path from the at least one drain out of the lower spin bearing chamber to the oil collection chamber;
   the at least one return oil pump being provided to pump oil from the oil collection chamber to the oil reservoir.

16. The gyrostabiliser of claim 15, further comprising an oil cooler.

17. The gyrostabiliser of claim 11, further comprising a vacuum chamber oil scavenge cavity located in the housing towards the bottom of the vacuum chamber.

18. The gyrostabiliser of claim 17, wherein the vacuum chamber oil scavenge cavity is connected to the oil collection chamber by a pumping arrangement.

19. The gyrostabiliser of claim 18, wherein the pumping arrangement comprises: an intermediate tank; a lower valve for selectively communicating the intermediate tank to the oil collection chamber; an upper valve for selectively communicating the vacuum chamber oil scavenge cavity to the intermediate tank; and a pressure switching valve for selectively communicating the intermediate tank with the vacuum chamber or atmosphere.

20. The gyrostabiliser of claim 11, further comprising an air circuit comprising:
   a vacuum pump in fluid communication with the vacuum chamber, and
   an air dryer.

21. The gyrostabiliser of claim 20, wherein the air circuit further comprises a pressure switching valve and an intermediate tank and:
   a conduit connecting the pressure switching valve to the air dryer,
   a conduit connecting the pressure switching valve to the intermediate tank, and a conduit connecting the pressure switching valve to the vacuum chamber.

22. The gyrostabiliser of claim 20, wherein the air circuit further comprises a vent relief valve connected by a reservoir pressure conduit to a port at or toward a top of the oil reservoir.

23. The gyrostabiliser of claim 22, wherein the air circuit further comprises a pressure regulating valve connected between the reservoir pressure conduit and a port on the housing.

24. The gyrostabiliser of claim 23, wherein the air circuit further comprises an oil trap in the reservoir pressure conduit between the vent relief valve and the oil reservoir, the pressure regulating valve being connected to the reservoir pressure conduit by a port toward a base of the oil trap.

25. The gyrostabiliser of claim 22, wherein the air circuit further comprises a bleed back check valve between the reservoir pressure conduit and the air dryer.

26. The gyrostabiliser of claim 1, further comprising a coolant circuit comprising:
   a coolant pump;
   a coolant reservoir;
   at least one oil heat exchanger; and
   a water heat exchanger.

27. The gyrostabiliser of claim 26, wherein the coolant circuit further comprises a cooling jacket for the upper spin bearing and a cooling jacket for the lower spin bearing.

28. The gyrostabiliser of claim 26, wherein the coolant circuit further comprises a cooling plate or jacket for one or more of a spin motor, a spin motor drive, a precession motor and a precession motor drive.

29. The gyrostabiliser of claim 26, wherein the coolant circuit further comprises a cooling jacket for the spin braking resistor.

30. The gyrostabiliser of claim 26, wherein the cooling circuit further comprises a bypass conduit or passage in parallel with a coolant flow path through the water heat exchanger and a bypass valve for controlling the balance of coolant flow through the bypass conduit or passage and through the coolant flow path through the water heat exchanger.

31. The gyrostabiliser of claim 26, wherein the at least one oil heat exchanger comprises a lubrication oil heat exchanger having an oil inlet and an oil outlet forming part of the oil circuit.

32. The gyrostabiliser of claim 26, wherein the at least one oil heat exchanger comprises a hydraulic oil heat exchanger having a hydraulic oil inlet and a hydraulic oil outlet forming part of a hydraulic circuit comprising a hydraulic manifold.

33. A lubrication arrangement for a vacuum chamber assembly for a gyrostabiliser, the vacuum chamber assembly comprising:
   a flywheel enclosed within a vacuum chamber formed by a housing; a flywheel shaft fixed to or integral with the flywheel and located relative to the housing by upper and lower spin bearings which permit rotation of the flywheel about the spin axis,
   an upper spin bearing chamber and an upper shaft seal around the flywheel shaft, the upper spin bearing chamber accommodating the upper spin bearing and being separated from the vacuum chamber by the upper shaft seal, allowing the upper spin bearing chamber to be maintained at a different pressure to the vacuum chamber,
   a lower spin bearing chamber and a lower shaft seal around the flywheel shaft, the lower spin bearing chamber accommodating the lower spin bearing, and being separated from the vacuum chamber by the lower shaft seal,
   wherein the lubrication arrangement provides at least one oil jet or spray into the upper spin bearing chamber and at least one oil jet or spray into the lower spin bearing chamber.

34. A system for lubricating a spin bearing of a gyrostabiliser, the system comprising a lubrication circuit, a coolant circuit and an air circuit.

35. The system of claim 34, wherein the lubrication circuit comprises at least one outlet for releasing lubricating oil into a bearing chamber housing the spin bearing.

36. The system of claim 35, wherein the coolant circuit comprises at least one lubricating oil heat exchanger for drawing heat out of the lubricating oil of the lubricating circuit.

37. The system of claim 35, wherein the coolant circuit comprises a pump and a water heat exchanger for drawing heat out of coolant in the coolant circuit.

38. The system of claim 35, wherein the air circuit comprises:
   a vacuum pump for drawing air out of the vacuum chamber; and
   valves to control a pressure in the bearing chamber to be between a pressure in a vacuum chamber of the gyrostabiliser and an atmospheric pressure.

39. The system of claim 35, further comprising an intermediate tank having an upper oil port, an upper air port, a lower oil port and a level sensor,
   wherein the lubrication circuit further comprises a first lockout valve between the upper oil port of the intermediate tank and a port towards a bottom of a vacuum chamber of the gyrostabiliser and a second lockout valve between the lower oil port of the intermediate tank and an oil collection chamber of the gyrostabiliser,
   the air circuit comprising a pressure switching valve to selectively communicate a conduit connected to the upper air port of the intermediate tank to either the vacuum chamber of the gyrostabiliser or to atmosphere.

\* \* \* \* \*